United States Patent [19]

Aoshika

[11] Patent Number: 4,787,592

[45] Date of Patent: Nov. 29, 1988

[54] DEVICE FOR HANGING BUILDING MEMBER

[75] Inventor: Takayuki Aoshika, Tokyo, Japan

[73] Assignee: 501 Ultima Ltd., Tokyo, Japan

[21] Appl. No.: 103,454

[22] Filed: Oct. 1, 1987

[30] Foreign Application Priority Data

Oct. 3, 1986 [JP] Japan .................................. 61-234515

[51] Int. Cl.$^4$ .................................................. A47H 1/10
[52] U.S. Cl. ..................................... 248/327; 24/136 R
[58] Field of Search ............... 248/327, 62, 317, 412; 52/484, 39, 28; 24/115 M, 130, 136 R, 136 L

[56] References Cited

U.S. PATENT DOCUMENTS

| | | | |
|---|---|---|---|
| 1,628,235 | 5/1927 | Meo | 24/136 R |
| 1,781,080 | 11/1930 | Ring | 24/136 R |
| 3,776,586 | 12/1973 | Ahlgren | 24/136 R X |
| 3,965,543 | 6/1976 | Connors | 24/136 R |
| 3,978,574 | 9/1976 | Stith | 248/678 X |
| 4,141,117 | 2/1979 | Gompel | 24/136 R |
| 4,656,698 | 4/1987 | Arakawa | 24/136 R X |

*Primary Examiner*—J. Franklin Foss
*Attorney, Agent, or Firm*—Charles E. Baxley

[57] ABSTRACT

A device for hanging a building member contains a gripper adapted to be secured to an anchor member embeded in a ceiling wall of a building, a wire article hanging from and secured to the gripper at its one end, and a second gripper adapted for securing the other end of the wire article and for hanging a building member. The gripper allows the wire article to pass in one direction along the longitudinal direction of the wire article but not in the opposite direction.

6 Claims, 3 Drawing Sheets

FIG.1a
FIG.1c
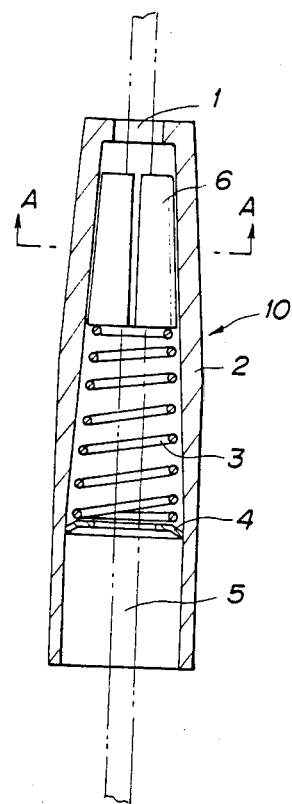
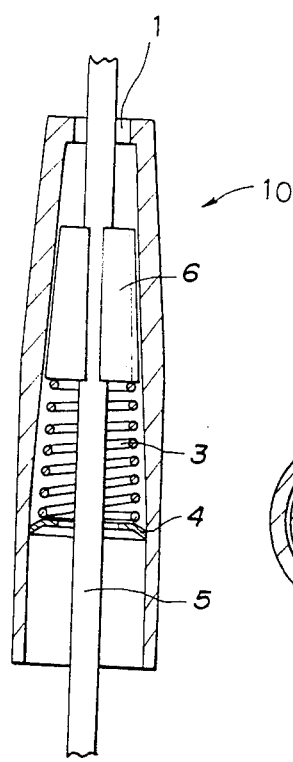
FIG.1b
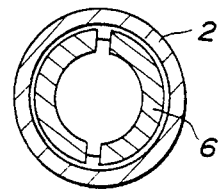
FIG.2a
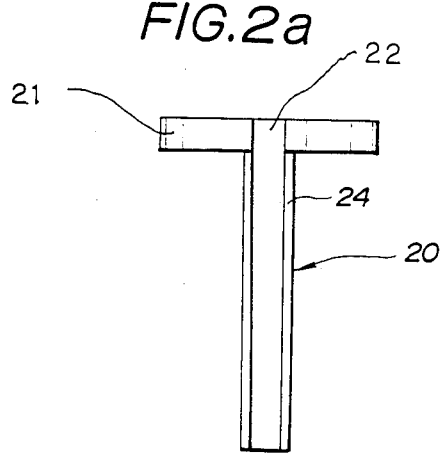
FIG.2b
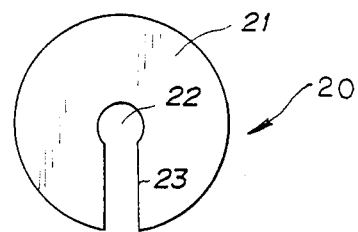

DEVICE FOR HANGING BUILDING MEMBER

BACKGROUND OF THE INVENTION

This invention relates to a device for hanging a building member. More particularly, it relates to a device for hanging a building member whereby the building member can be easily adjusted in height and secured at a prescribed height position.

Presently, the building members, such as ceiling plates, air conditioning ducts, electric wiring cables, gas ducts, public water supply piping, sewer piping or illuminators, are hung from a ceiling wall of a building. For hanging these building members, a hanging device 60 such as shown in FIG. 6 is used. The hanging device 60 is composed of an anchor member 62 embedded in a ceiling wall 61, a steel rod 63, and a bracket 65 clamped and secured in position by nuts 64a, 64b threadedly mounted to the steel rod 63. A supporting member 66, for example, is mounted on the bracket 65 and a building member, such as a ceiling plate, not shown, is secured to the supporting member 66.

With the use of the hanging device 60, after the steel rod 63 is threadedly attached to the anchor member 62, the nut 64a is threadedly attached to the steel rod 63. The bracket 65 is then introduced halfway on the steel rod 63 and the nut 64b is threadedly attached to the steel rod 63. The nuts 64a, 64b are manipulated for adjusting the height position of the supporting member 66. The sequence of these operations is highly troublesome and time-consuming since it is necessary that the nuts be attached and turned manually for setting to desired positions. In addition to only poor operability, sufficient scaffolding is not provided since the operator must work at an elevated position, so that there is high risk of labor accidents.

OBJECTS AND SUMMARY OF THE INVENTION

It is a principal object of the present invention to provide a device for hanging a building member whereby the building member can be easily hung and set to the desired adjusted height position with high efficiency.

It is another object of the present invention to provide a device for hanging a building member which is less costly and simple in structure.

It is a still another object of the present invention to provide a device for hanging a building member wherein the device can be preset before launching the hanging operation, thereby reducing the duration of the hanging operation on the building site.

These and other objects of the present invention will become apparent from the following description when taken in conjunction with the accompanying drawings.

According to the present invention, there is provided a device for hanging a building member comprising wire article securing means adapted to be secured to an anchor member secured to a ceiling wall of a building for hanging and securing a wire article, and building member securing means adapted to be hung and secured by the wire article for hanging the building member, at least one of the wire article securing means and the building member securing means comprising a wire article gripper adapted for securing the wire article by allowing the wire article to be passed therethrough in one direction along the longitudinal direction of the wire article but not in the opposite direction.

BRIEF DESCRIPTION OF THE DRAWINGS

FIG. 1a is a longitudinal sectional view showing a gripper of a first embodiment employed in the present invention;

FIG. 1b is a sectional view taken along line A—A of FIG. 1a;

FIG. 1c is a longitudinal sectional view showing the cable as it is passed through the gripper of FIGS. 1a and 1b;

FIG. 2a is a side view showing a cable extraction tool used with the gripper of FIG. 1a;

FIG. 2b is a plan view of FIGS. 2a;

FIGS. 3b and 3c are diagrammatic views showing the cable being extracted from the gripper of FIG. 3a;

PREFERRED EMBODIMENTS OF THE INVENTION

Figure 3A:
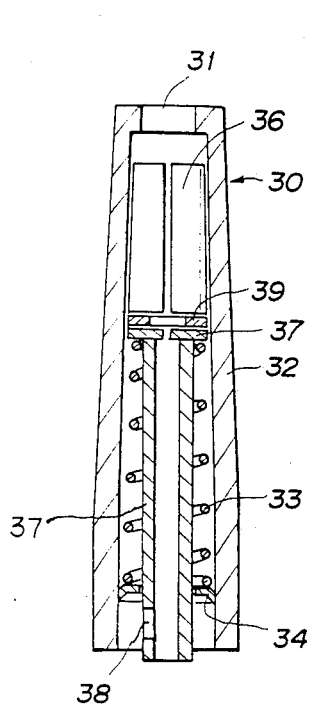
FIG 3a is a longitudinal sectional view showing a gripper of a second embodiment employed in the present invention.

Referring to the accompanying drawings, preferred illustrative embodiments of the present invention will be described in detail.

Firstly, a gripper 10, 30 employed as an essential element for a device for hanging a building member according to the present invention is explained.

In FIGS. 1a and 1b, there is shown a gripper 10 for a cable 5 according to a first embodiment employed in the present invention. The gripper 10 has a substantially cylindrical outer casing 2 having in turn an opening 1 in an upper end face and an inner surface tapering towards the top. Within the interior of the outer casing 2, there are disposed semicylindrical split gripping or locking elements 6, 6 each having a larger diameter towards the bottom. These gripping elements cojointly define an inner bore of a size to receive the cable 5 of a predetermined constant diameter. Several ribs and recesses, although not shown, are alternately formed on the inner bore surface transversely of the cable 5. The outer surfaces of the split gripping elements 6, 6 are formed into tapered surfaces substantially complementary to the tapered inner surface of the outer casing 2. Thus, when mated to each other, the gripping elements 6, 6 cojointly assume the shape of a truncated cone having a larger diameter towards the bottom. Below these gripping elements 6, 6 within the outer casing 2, a spring holding member 4 in the form of a thin disk having a central opening of a size sufficient to permit the cable 5 to pass therethrough is introduced from the lower opening of the outer casing 2 and has a press fit within the inner bore of the outer casing 2. A compression spring 3 is installed under compression between the spring holder 4 and the bottom surfaces of the gripping elements 6, 6. When the cable 5 is introduced from the upper opening 1, the gripping elements 6, 6 are lowered against the force of the compression spring 3 at the same time when the force thrusting the cable 5 downward acts on the split elements 6, 6 so that the latter are extended apart radially outward. As a result, the cable 5 is passed through an annular space defined by the gripping elements 6, 6 so as to be introduced through the outer casing 2. While the cable 5 is movable freely in the downward direction in FIG. 1, it is restrained in the upper direction under the wedging action of the gripping elements 6, 6 biased in the direction of the opening 1 by the compression spring 3. In such manner, the cable 5 is restrained completely in one direction, that is, in the upward direction, as seen in FIGS. 1a and 1c.

FIG. 1c illustrates the cable 5 being introduced into the unidirectional gripper 10 against the force of the compression spring 3.

The cable 5 can be withdrawn in the downward direction but not in the upward direction, as discussed hereinabove. Therefore, when the upper end of the cable 5 is secured to a ceiling wall, it cannot be extracted from the outer casing 2. In order that the cable 5 can be extracted in such a case from the upper opening 1, an extraction device shown in FIGS. 2a and 2b is employed. The device 20 is comprised of a disk 21 having a radial slot 23 for introducing the cable 5 from outside and a central opening 22 communicating therewith, and a semicylindrical shank 24 having an inside diameter equal to the diameter of the central opening 22 and an outside diameter smaller than the diameter of the opening 1 and larger than the diameter of the inner bore of the gripping elements 6, 6 when in the position of utmost extension.

The portion of the cable 5 extending upwards from the opening 1 is introduced into the inside of the shank 24 and the central opening 22 of the disk 21 and the shank 24 with the cable 5 held therein is introduced into the inside of the outer casing 2 through the upper opening 1 for pressing the gripping elements 6, 6 therein. In this manner, the gripping elements 6, 6 are lowered against the force of the spring 3 while they are extended radially outwards to release the cable 5 so that the cable 5 is now able to be extracted towards above through the opening 1.

FIG. 3a illustrates a unidirectional gripper 30 according to a modified embodiment employed in the present invention. In the present embodiment, the outer casing 32, the gripping elements 36, 36 and a spring holding member 34 similar to the spring holder 4 are designed and arranged similarly to the preceding embodiment already described in connection with FIGS. 1a and 1b. However, the compression spring 33 is supported between the spring holding member 34 and an upper end 50 or shoulder of a cylindrical holder 37 freely disposed below the gripping elements 36, 36 with the interposition of a ring 39. The operation of the unidirectional gripper 30 according to the present embodiment is similar to that of the preceding embodiment shown in FIGS. 1a and 1b with the exception that the cable is not passed simply through the inside of the compression spring 3, but is guided through the inside of the cylindrical holder 37, and that the cable is extracted upward in a different manner through the opening 31. Referring now to this mode of extraction, a through-hole 38 of a size sufficient to permit the passage of a manual tool 41, such as a screw driver, is formed in the vicinity of the lower end of the holder 37. When the tool 41 such as the screw driver is introduced into the through-hole 38 as shown in FIG. 3b and manipulated to pull the holder 37 downward against the action of the spring 33, the gripping elements 36, 36 may be extended apart radially outwards so that the cable 5 may be extracted through the through-opening 31.

Figure 3B:
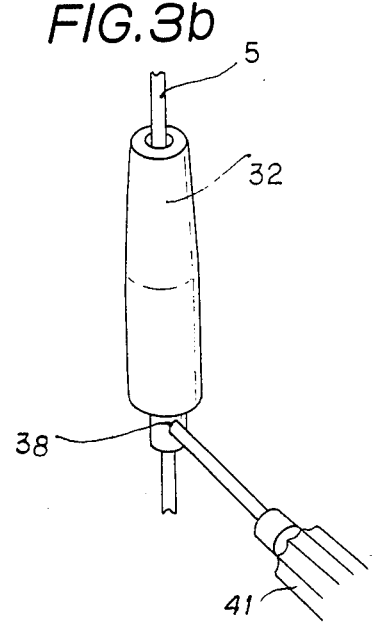
Figure 3C:
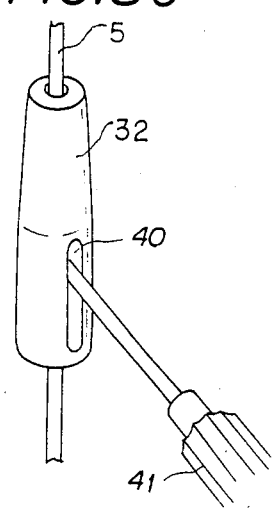

Alternatively, an elongated opening 40 may be formed vertically in the lateral side of the outer casing as shown in FIG. 3c and the tool 41 introduced through the through-hole 40 as shown to manipulate the compression spring 33 such that the cable 5 may be extracted upward through the opening 31 of the outer casing 32. In such a case, a through-hole may also be provided in the holder 37 at a position facing to the elongated opening 40.

It will be noted that, when the holder 37 shown in FIG. 3a is pulled down in the manner shown in FIGS. 3b and 3c, the ring 39 and the gripping elements 36, 36 may be left loosely within the interior of the outer casing 32 with the ribs and recesses of the retaining elements 36, 36 biting into the cable 5, such that the cable cannot be disengaged from the retaining elements and hence cannot be extracted upward through the upper opening 31. In order to prevent this, the holder 37 can be connected to the gripping elements 36 by the ring 39 so that the gripping elements 36 can be lowered smoothly by lowering the holder 37.

Figure 4:
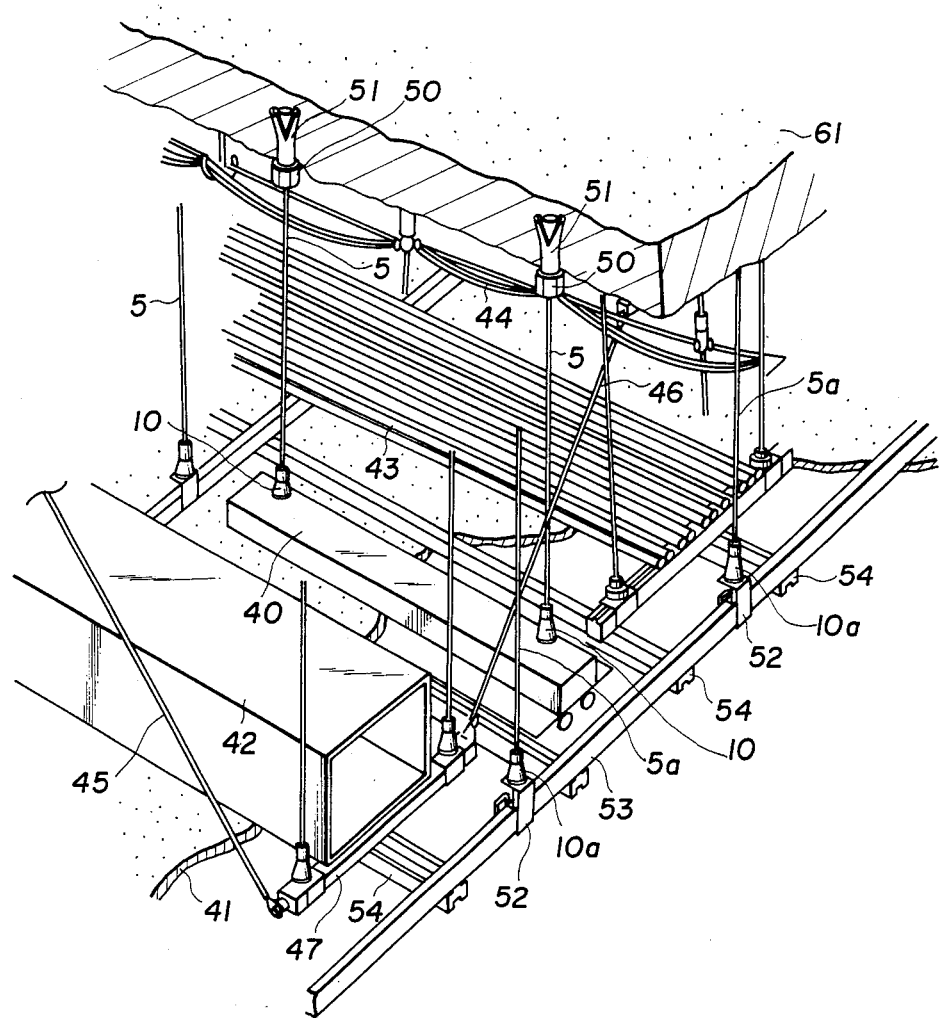
FIG. 4 is a perspective view showing several hanging devices of the present invention being used for hanging a variety of buiding members, with portions being removed.

FIG. 4 illustrates a variety of building members hung by a plurality of the hanging devices of the present invention. As described later, each of a number of grippers 50 arranged and designed as shown in FIGS. 1a to 1c is threadedly attached to an associated anchor member 51. Each of a number of cables 5, 5a is passed at one end through an associated gripper 50 and at the other end through an associated gripper 10, 10a arranged and designed as shown in FIGS. 1a to 1c. An illuminator 40 is hung by grippers 10, 10 associated with cables 5, 5, grippers 50, 50 and anchor members 51, 51. One other cable 5a has its one end passed through a gripper 50 and has its other end passed through an associated gripper 10a. The gripper 10a is secured to a bracket 52 supporting a beam member 53. A number of cross beam members 54 are secured to the beam member 53 orthogonally thereto, and a ceiling plate 41 is secured to these cross beam members 54. An air conditioning duct 42, public water supply and sewage piping 43 and electrical cables 44 may be hung similarly by associated grippers 50 and anchor members 51. In hanging the duct 42, it is placed on a pair of bars 47, only one of the bars being shown, with the bar 47 being connected to the grippers 10. For securing the building members, herein the duct 42, in the hung state, cables 45, 46 may be placed taut in the inclined position for securing the bar 47.

Figure 5:
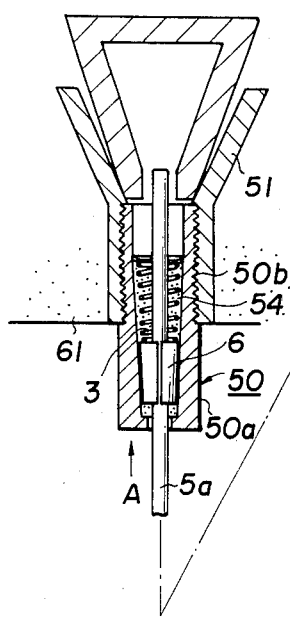
FIG. 5 is a partial sectional view showing an embodiment of the hanging device of the present invention.
Figure 6:
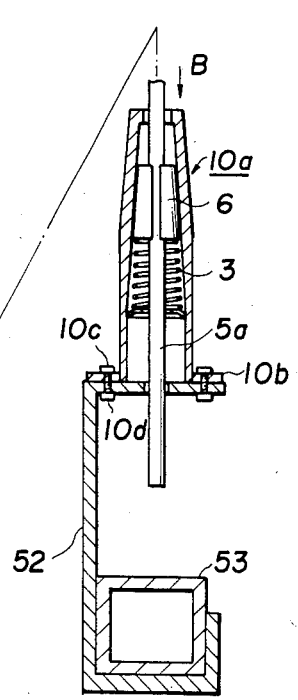
FIG. 6 is a partial sectional view showing an example of the conventional hanging device.
Figure 6:
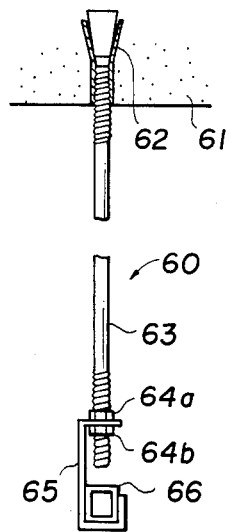

FIG. 5 illustrates the grippers 50, 10a and the cable 5a used for hanging the beam member 53 of FIG. 4. As stated above, the gripper 50 is arranged and designed practically in the same way as the gripper 10 shown in FIGS. 1a to 1c, so that only different members are indicated by new reference numerals and the remaining members are indicated by the same numerals. The gripper 50 is attached to the anchor member 51 in a topsy-turvied position with respect to the position of the gripper 10 shown in FIGS. 1a to 1c. The gripper 50 has a lower outer casing 50a having a polygonal cross-section for affording a threaded connection by using a suitable tool, such as a spanner, not shown. The gripper 50 has a threaded upper outer casing 50b for affording a threaded connection to the anchor member 51. The cable 5a can be firmly secured by being inserted in the direction of the arrow mark A. A suitable binder 54, such as a silicone binder, may be injected around the gripping elements 6, 6 for securing the elements against incidental extraction under effect of vibrations. The cable 5a is passed through the gripper 10a in the direction of the arrow mark B. The gripper 10a has a lower end flange 10b by which the gripper is secured to the bracket 52 by a bolt 10c and a nut 10d. The bracket 52 can be previously secured to the gripper 10a so that the position of the bracket 52 can be adjusted by simply passing the cable 5a through the gripper 52 on the construction site. The beam member 53 is mounted on the bracket 52 to which the cross beam members 54 are secured by means well known in the art, and then the ceiling plate 41 is suitably bonded to the lower sides of the cross beam members 54, as shown in FIG. 4. Although two grippers 50, 10a are used in the present embodiment for securing the cable 5a, the cable may also be secured at one end by one gripper and secured at the other end by means well known in the art, such as clamps. It will be noted that the term "a wire article" herein used means any wire, rope, cable, string, cord, etc. made of metal, natural or synthetic material or the like having a tensile strength sufficient for connection, securing or tensioning.

Although the present invention has been described with reference to the preferred embodiments, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A device for hanging a building member comprising wire article securing means adapted to be secured to an anchor member secured to a ceiling wall of a building for hanging and securing a wire article, and building member securing means adapted to be hung and secured by said wire article for hanging a building member, at least one of said wire article securing means and said building member securing means comprising a kit consisting of a wire article gripper and a wire article extraction device, said wire article gripper including an outer casing having an inner surface tapering towards one end of the casing and having an opening for introducing a wire article therethrough, a split gripping element accommodated within said outer casing and having a tapered outer surface complementary to said tapered inner surface, and a spring member held between a spring holding element secured within said outer casing and said split gripping element, said spring member normally biasing said split gripping element towards said one end, the arrangement being such that, when the wire article is forced to be inserted through said opening into said outer casing against the action of said spring member, said gripping element is moved along said tapered surfaces while being extended radially outward to permit said wire article to be introduced into the inside of said outer casing and after the wire article is introduced to a predetermined position and when the forcing operation is discontinued, the spring member thrusts the split gripping element along the tapered surfaces until the wire article is clamped and secured in position by the gripping element, said wire article extraction device including a disk having a radial slot for introducing the wire article thereinto from the outside and a central opening communicating with said radial slot and a semicylindrical shank having an inside diameter equal to the diameter of said central opening, said wire article extraction device being applied from outside to the portion of the wire article extending above said wire article gripper when said wire article is inserted into and clamped in said wire article gripper, said portion of said wire article being then received in said central opening and in said shank, and said wire article extraction device being then lowered through said opening onto the upper surface of said split gripping element to cause said split gripping element to be lowered and simultaneously extended apart radially against the force of said spring to release said wire article.

2. A device for hanging a building member comprising wire article securing means adapted to be secured to an anchor member secured to a ceiling wall of a building for hanging and securing a wire article, and building member securing means adapted to be hung and secured by said wire article for hanging a building member, at least one of said wire article securing means and said building member securing means comprising a kit consisting of a wire article gripper and a wire article extraction tool, said wire article gripper including an outer casing having an inner surface tapering towards one end of the casing and having an opening for introducing a wire article therethrough, a split gripping element accommodated within said outer casing and having a tapered outer surface complementary to said tapered inner surface, a cylindrical holder within said outer casing, and a spring member held between a spring holding element secured within said outer casing and said holder, said spring member normally biasing said split gripping element towards said one end, the arrangement being such that, when the wire article is forced to be inserted through said opening into said outer casing against the action of said spring member, said gripping element is moved along said tapered surfaces while being extended radially outward to permit said wire article to be introduced into the inside of said outer casing and after the wire article is introduced to a predetermined position and when the forcing operation is discontinued, the spring member thrusts the split gripping element along the tapered surfaces until the wire article is clamped and secured in position by the gripping element, a through-hole being formed in said holder for introducing said tool therethrough into the inside of said outer casing to move said holder and said spring member such that said gripping element is moved along said tapered surfaces and simultaneously extended radially outward to release said wire article.

3. A device for hanging a building member according to claim 2 wherein an elongated opening is provided in said outer casing at a position facing to said through-hole.

4. A device for hanging a building member according to claim 2 wherein said holder an said gripping element are connected to each other directly or indirectly such that said gripping element is moved when said holder is moved.

5. A device for hanging a building member comprising wire article securing means adapted to be secured to an anchor member secured to a ceiling wall of a building for hanging and securing a wire article, and building member securing means adapted to be hung and secured by said wire article for hanging a building member, at least one of said wire article securing means and said building member securing means comprising a kit consisting of a wire article gripper and a wire article extraction tool, said wire article gripper including an outer casing having an inner surface tapering towards one end of the casing and having an opening for introducing a wire article therethrough, a split gripping element accommodated within said outer casing and having a tapered outer surface complementary to said tapered inner surface, and a spring member held between a spring holding element secured within said outer casing and said split gripping element, said spring member normally biasing said split gripping element towards said one end, the arrangement being such that, when the wire article is forced to be inserted through said opening into said outer casing against the action of said spring member, said gripping element is moved along said tapered surfaces while being extended radially outward to permit said wire article to be introduced into the inside of said outer casing and after the wire article is introduced to a predetermined position and when the forcing operation is discontinued, the spring member thrusts the split gripping element along the tapered surfaces until the wire article is clamped and secured in position by the gripping element, a throughhole being formed in said outer casing for introducing a tool therethrough into the inside of said outer casing to move said spring member such that said gripping element is moved along said tapered surfaces and simultaneously extended radially outward to permit said wire article to be passed freely through the gripper to release the wire article.

6. A device for hanging a building member according to claim 5 wherein said holder and said gripping element are connected to each other directly or indirectly such that said gripping element is moved when said holder is moved.

* * * * *

UNITED STATES PATENT AND TRADEMARK OFFICE
CERTIFICATE OF CORRECTION

PATENT NO. : 4,787,592
DATED : November 29, 1988
INVENTOR(S) : Takayuki Aoshika

It is certified that error appears in the above-identified patent and that said Letters Patent is hereby corrected as shown below:

On the Preamble sheet, in Column 1, Item [73]

"501" should be deleted.

Signed and Sealed this

Fourth Day of July, 1989

Attest:

DONALD J. QUIGG

Attesting Officer

Commissioner of Patents and Trademarks